US006113169A

United States Patent [19]

Gohman et al.

[11] Patent Number: 6,113,169

[45] Date of Patent: Sep. 5, 2000

[54] MAGNETIC DEBRIS PICKUP DEVICE

[75] Inventors: Bret A. Gohman, South Haven; Kyle A. Bjork, Buffalo, both of Minn.

[73] Assignee: Malco Products, Inc., Annandale, Minn.

[21] Appl. No.: 09/427,877

[22] Filed: Oct. 27, 1999

[51] Int. Cl.[7] .............................. B03C 1/00; B25J 15/06

[52] U.S. Cl. .............................. 294/65.5; 209/215

[58] Field of Search .............................. 294/65.5, 19.2; 15/105, 160; 209/215–217, 228, 229; 335/285, 291, 293; 414/440; 56/400.02, 400.11

[56] References Cited

U.S. PATENT DOCUMENTS

| | | | |
|---|---|---|---|
| 610,767 | 9/1898 | Monell | 209/215 |
| 2,426,795 | 9/1947 | Sjostrom | 294/65.5 |
| 2,455,319 | 11/1948 | Stearns | 209/215 |
| 2,654,480 | 10/1953 | Stem | 294/65.5 |
| 2,693,279 | 11/1954 | Box et al. | 209/215 |
| 2,709,002 | 5/1955 | Hoff | 294/65.5 |
| 3,377,641 | 4/1968 | McGregor | 294/65.5 |
| 3,451,488 | 6/1969 | Taketa | 414/440 |
| 5,624,146 | 4/1997 | De Los Reyes et al. | 294/65.5 |

FOREIGN PATENT DOCUMENTS

| | | | |
|---|---|---|---|
| 1818076 | 5/1993 | U.S.S.R. | 294/65.5 |

OTHER PUBLICATIONS

A & A Magnetics, Magnetic Sweepers, pp. 1–3 (no date).
The Magnet Source, Magnets Menu, pp. 1–3 (no date).
MK185 Indoor Sweeper Magnet, pp. 1–2 (Jul. 1998).
Walker Magnetics, Walker Products & Services, LFS Services Lightweight Push–Type Sweepers, pp. 1–2 (no date).
Superior Magnetic Products, and attached product information, 7 pages (no date).
Company Profile IMI, Making magnets since 1961!, p. 1 (no date).
Online Catalog HOME, Magnetic Sweepers, pp. 1–3 (no date).
Livonia Magnetic Company, Inc., Magnetic Floor Sweeper/Flexible Magnetic Rubb . . . , pp. 1–2 (1998).
Bott Co Trucks, Your New Capacity Dealer, pp. 1–3, p. 1 (no date).
AEC Magnetics, Magnetic Specialists for Automated Manufacturing, p. 1 (no date).
Product information for Nail Hound Magnetic Sweeper, Releasable Magnetic Nail Sweep, and Magnetic Nail Sweep, one page (no date).
Tool Crib, Catalog #901, Jan./Feb. 1999 issue, 2 pages.
Grate Magnets, Dings magnetic group, product catalog, 8 pages, Bulletin 1213 (997) (no date).
Dings magnetic group, Magnetic Sweeper Prices, Jul. 3, 1995.
Dings magnetic group, Magnetic Separators for Ferrous and Nonferrous Metals, Catalog 1 (797), 12 pages (no date).
Dings magnetic group, Savings Guide Magnetic Sweepers, Catalog 7 (1196), 12 pages (no date).
Bunting Magnetics Co. Magnetic Sweepers, Catalog #895, Jul. 1998, price sheet #895, Bunting Mail/Fax Order Form, and letter from Bunting Magnetics Co. to Mr. Steve Thompson, dated Aug. 12, 1998.
Make a Clean Sweep for a Safe Worksite with Superior Magnetic Products! brochure, 2 pages (no date).

*Primary Examiner*—Dean J. Kramer
*Attorney, Agent, or Firm*—Gerald E. Helget; Rider, Bennett, Egan & Arundel

[57] ABSTRACT

A magnetic device for picking up ferrous metal debris, such as nails, screws, sheet metal fragments, staples, rivets, and other ferrous metal objects from an environmental surface such as the ground or a floor by rolling along the surface, consists of: a magnetic pickup member; a pair of wheels mounted to the magnetic pickup member and supporting the magnetic pickup member slightly above the environmental surface; a handle; a wiper for scraping ferrous metal debris from the magnetic pickup member and biased against the magnetic pickup member; and a release rope for rotating the magnetic pickup member against the wiper, thereby dislocating ferrous metal debris from the magnetic pickup member. Optionally, a hopper may be attached to the device for receiving the ferrous metal debris.

18 Claims, 3 Drawing Sheets

MAGNETIC DEBRIS PICKUP DEVICE

BACKGROUND OF THE INVENTION

The present invention relates to a magnetic pickup device for picking up ferrous metal debris, such as nails, screws, sheet metal fragments, staples, rivets, and other ferrous metal objects from the ground or a floor, and particularly to a magnetic pickup device that rolls over the surface.

During assembly of end products in many industries, such as auto manufacturing, light manufacturing, assembly, machining, etc., a variety of ferrous metal debris falls onto the floor of the plant. For example, sheet metal fragments from machining may scatter widely around the cutting operation. In addition, many different types of fasteners used in assembly may be dropped during assembly of such end products as mobile homes, truck bodies, and recreational vehicles. Such ferrous metal debris presents an environmental hazard to workers and to the tires of forklifts and other vehicles used in the plant.

In storage yards, damage to vehicle tires may occur due to penetration by nails, wire, scrap metal, and other ferrous metal debris.

During home construction, nails and screws may be a particularly difficult problem for the contractor, especially during the roofing phase of construction. Further, re-roofing a home presents an even more significant problem of nails falling to the ground and puncturing tires and safety issues.

Earlier magnetic pickup devices may be rolled along the floor or ground to pick up ferrous metal objects. However, many of these devices did not have a hopper to hold the debris after pickup. This required the operator to return to a dump area to remove the debris, and then return to the pickup area for more cleaning.

Another problem with some earlier devices was that no release feature existed. Ferrous metal debris that was picked up could not easily be removed from the pickup device, except by intensive hand labor. Earlier devices that did have a release feature required a great deal of force to separate the debris from the magnet when fully loaded.

There is a need for a magnetic pickup device for ferrous metal objects. The device should optionally have a hopper for temporarily storing ferrous metal debris. There should also be a mechanism for easily scraping the ferrous metal debris off the magnetic pickup device and for reducing the force needed to release debris.

SUMMARY OF THE INVENTION

A magnetic device for picking up ferrous metal debris, such as nails, screws, sheet metal fragments, staples, rivets, and other ferrous metal objects from an environmental surface such as the ground or a floor by rolling along the surface, consists of: a magnetic pickup member; a pair of wheels mounted to the magnetic pickup member and supporting the magnetic pickup member slightly above the environmental surface; a handle; a wiper for scraping ferrous metal debris from the magnetic pickup member and biased against the magnetic pickup member; and a release rope for rotating the magnetic pickup member against the wiper, thereby dislocating ferrous metal debris from the magnetic pickup member. Optionally, a hopper may be attached to the device for receiving the ferrous metal debris.

DETAILED DESCRIPTION OF THE PREFERRED EMBODIMENTS

Figure 1:
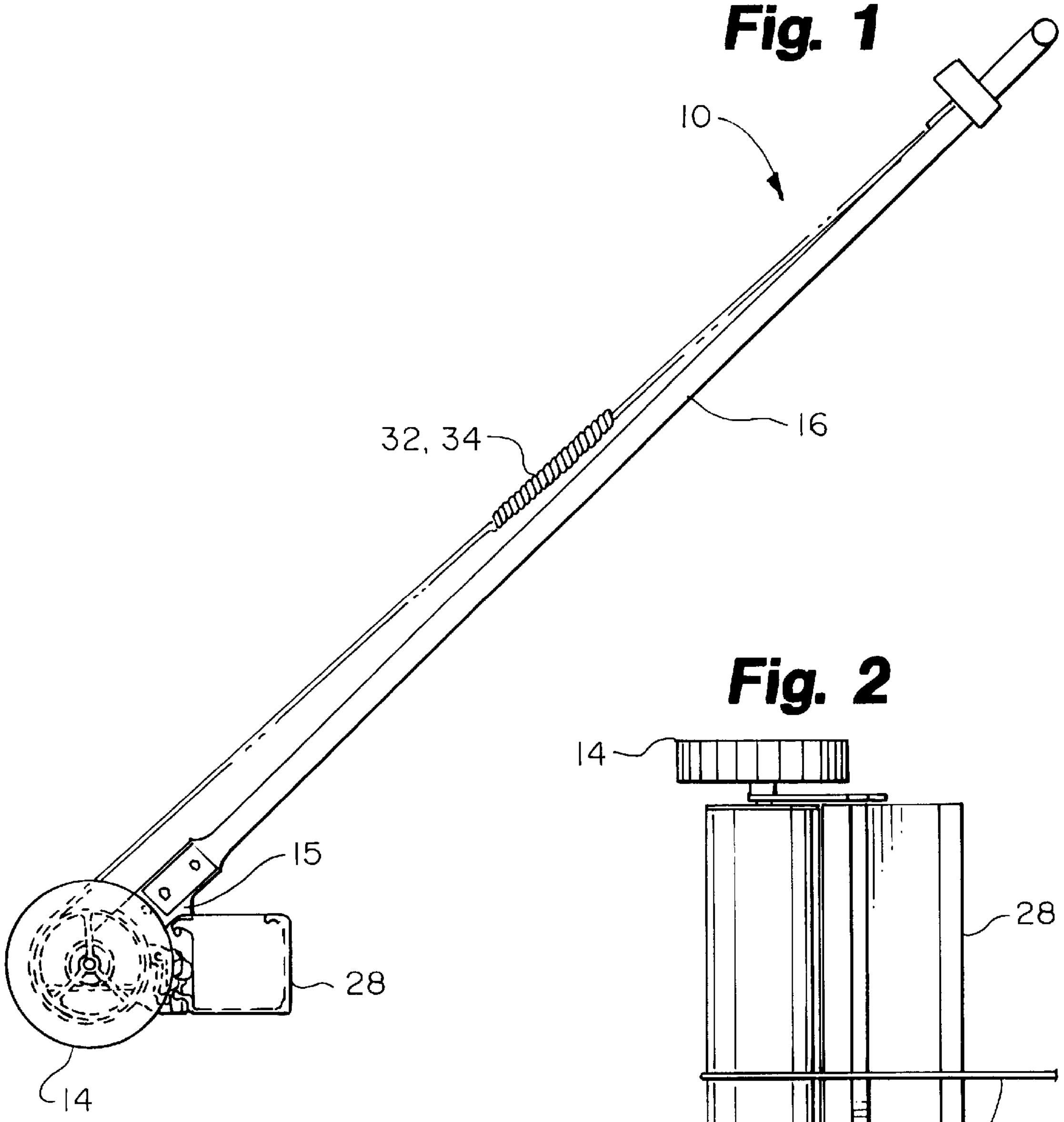
FIG. 1 is a side elevational view of the magnetic pickup device of the present invention.
Figure 2:
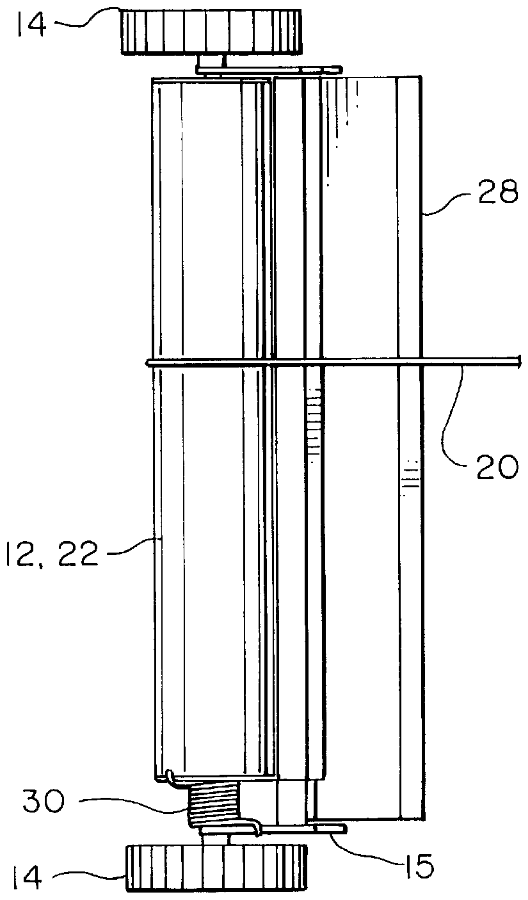
FIG. 2 is a partial top plan view of the magnetic pickup device of the present invention.
Figure 3:
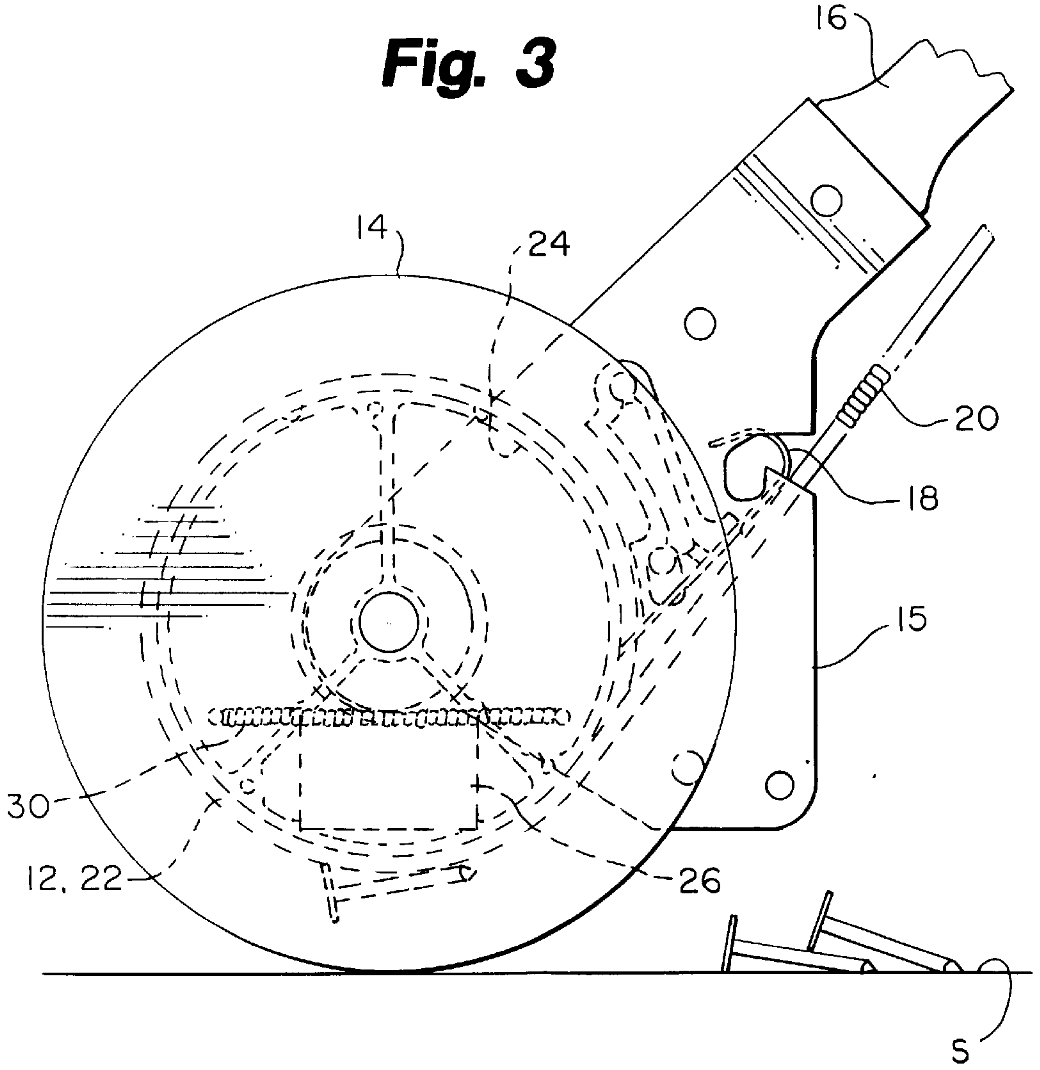
FIG. 3 is a schematic of the magnetic pickup device of the present invention, without a hopper.
Figure 4:
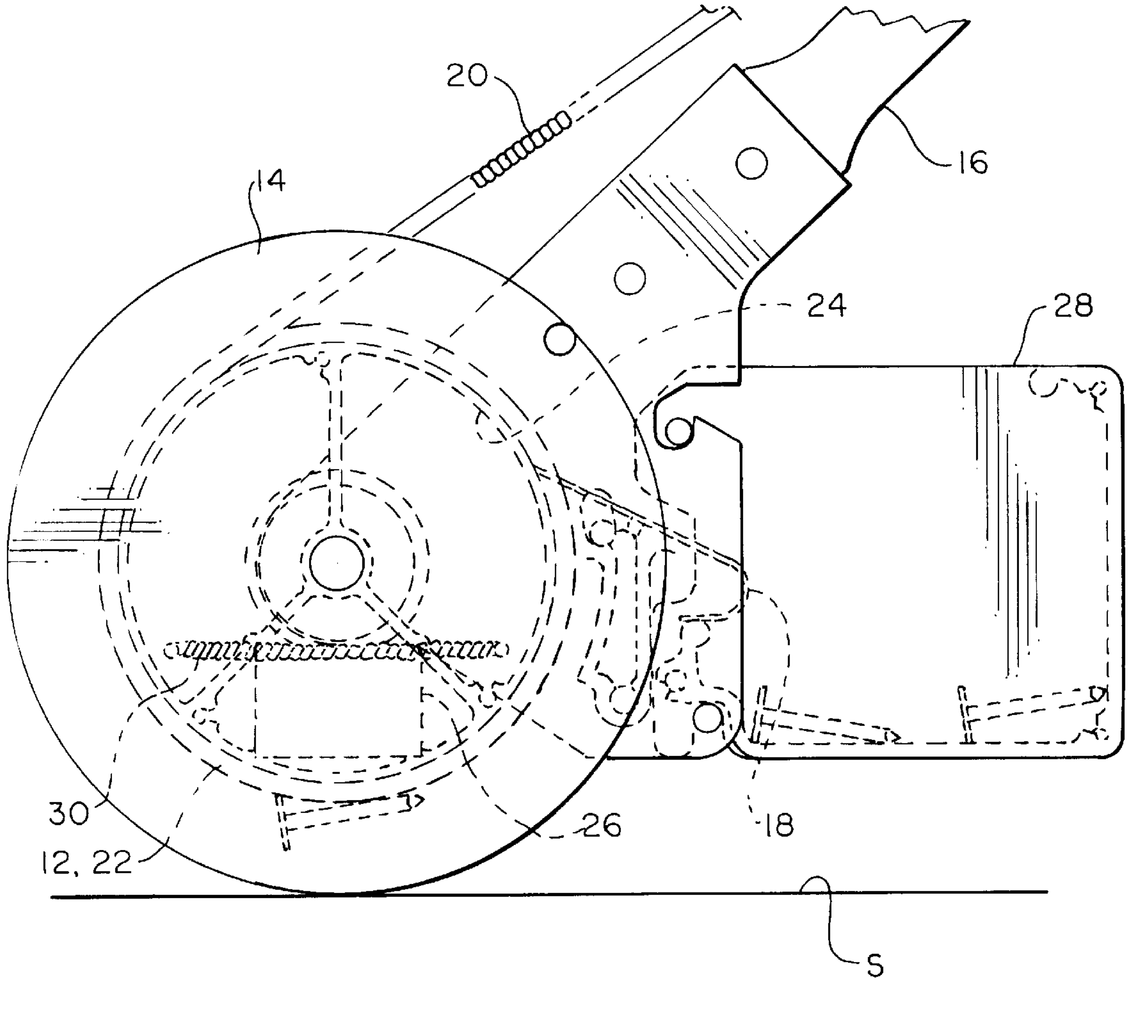
FIG. 4 is a schematic of the magnetic pickup device of the present invention, with a hopper.

The magnetic ferrous metal debris pickup device of the present invention is shown generally in the Figures as reference numeral 10.

The device 10 is rolled either forward or backward over an environmental surface S which has ferrous metal debris thereon.

The device 10 comprises a magnetic pickup member 12; a pair of wheels 14 mounted to the magnetic pickup member 12 and supporting the magnetic pickup member 12 slightly above the environmental surface S; a handle 16; a wiper 18 for shearing ferrous metal debris from the magnetic pickup member 12; and a release rope 20 for rotating the magnetic pickup member 12 against the wiper 18, thereby dislocating ferrous metal debris from the magnetic pickup member 12. The wheels 14 may be mounted to a housing 15, and the handle 16 may be attached to the housing 15.

The magnetic pickup member 12 is preferably a cylindrical non-ferrous pickup bar 22 with a hollow core 24 containing a magnet 26. More than one cavity could also be used, and each cavity may have multiple magnets. Aluminum is the preferred material, although the pickup bar 22 could be made of any non-ferrous material, such as stainless steel or plastic. Ferrous metal should not be used in the pickup bar 22, because this would dissipate the magnetic lines of force from the magnet 26.

Optionally, a removable hopper 28 may be attached to the device 10 to receive ferrous metal debris sheared off the magnetic pickup member 12 or cylindrical non-ferrous pickup bar 22 by the wiper 18.

A spring 30 biases the magnet 26 next to the environmental surface S. It will therefore be seen that the magnetic pickup member 12 or cylindrical non-ferrous pickup bar 22 does not rotate with the wheels 14. Rather, the magnet 26 is kept in a position proximate to the environmental surface S. The spring 30 opposes the release rope 20, to return the magnet 26 to its operating position when the operator lets go of the release rope 20.

Preferably, a shock-absorbing device 32 is inserted in the release rope 20, to permit the magnetic pickup member 12 or cylindrical non-ferrous metal pickup bar 22 to rotate slightly clockwise and counterclockwise when it encounters a large obstacle, such as a piece of dirt, thereby preventing the obstacle from wiping the ferrous metal debris off the device. In the preferred embodiment, the shock-absorbing device 32 is a spring 34, such as a draw-bar spring.

To adjust the wiper 18 for any possible wear, the wiper 18 could be adjustably mounted to the device 10. The wiper IS may also be removably mounted to the device 10, to permit complete replacement.

In operation, the operator pushes the device 10 along the surface S by using the handle 16. Ferrous metal debris is attracted to the magnetic pickup member 12 and remains on it. When enough debris has accumulated, the operator either wheels the device 10 to a dump area, if it does not have a hopper 28, or cleans the device in place if it has a hopper.

To clean debris from the device, the operator pulls the release rope 20, which causes the magnetic pickup member 12 or cylindrical non-ferrous metal pickup bar 22 to rotate against the wiper 18. Continued rotation of the magnetic pickup member 12 or cylindrical non-ferrous metal pickup bar 22 takes the magnet 26 beyond the wiper 18, so that the debris falls off, either into the hopper 28 or directly into a dump area.

Because the debris is sheared off at an angle, rather than being pulled perpendicularly to the magnetic lines of force from the magnet 26, much less release force is needed with the present invention than with earlier devices.

If the device 10 encounters a large obstacle, such as a clump of dirt, as it is being rolled, the shock-absorbing device 32 will allow the magnetic pickup member 12 or cylindrical non-ferrous pickup bar 22 to rotate slightly either clockwise or counterclockwise, depending on the direction of movement, so that the debris is not scraped off by the obstacle.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A magnetic device for picking up ferrous metal debris, nails, screws, sheet metal fragments, staples, rivets, and other ferrous metal objects from an environmental surface, the ground or a floor by movement along the surface, the device comprising:

a) a magnetic pickup member;

b) a pair of supports mounted to the magnetic pickup member and supporting the magnetic pickup member slightly above the environmental surface;

c) a handle;

d) a wiper for shearing ferrous metal debris from the magnetic pickup member and biased against the magnetic pickup member; and e) a release member for rotating the magnetic pickup member against the wiper, thereby shearing ferrous metal debris from the magnetic pickup member.

2. The device of claim 1, further comprising a removable hopper adapted to receive ferrous metal debris sheared off the magnetic pickup member by the wiper.

3. The device of claim 1, wherein the magnetic pickup member has a hollow core and further comprising a permanent magnet mounted within the hollow core.

4. The device of claim 3, further comprising a spring adapted to bias the magnet next to the environmental surface.

5. The device of claim 4, wherein the spring opposes the release member.

6. The device of claim 5, further comprising a shock-absorbing device inserted in the release member, adapted to permit the magnetic pickup member to rotate slightly clockwise and counterclockwise, thereby preventing large obstacles from wiping the ferrous metal debris off the magnetic pickup member.

7. The device of claim 6, wherein the shock-absorbing device comprises a second spring.

8. The device of claim 1, wherein the wiper is adjustably and removably mounted to the device.

9. A magnetic device for picking up ferrous metal debris, nails, screws, sheet metal fragments, staples, rivets, and other ferrous metal objects from an environmental surface, the ground or a floor by rolling along the surface, the device comprising:

a) a cylindrical non-ferrous pickup bar having a hollow core;

b) a plurality of wheels mounted to the cylindrical non-ferrous pickup bar, the wheels being of larger diameter than the cylindrical non-ferrous pickup bar;

c) a permanent magnet mounted within the hollow core, and adapted to attract ferrous metal debris to the surface of the cylindrical non-ferrous pickup bar;

d) a handle; and e) a spring adapted to bias the magnet next to the environmental surface.

10. The device of claim 9, further comprising a wiper biased against the surface of the cylindrical non-ferrous pickup bar.

11. The device of claim 10, further comprising a removable hopper adapted to receive ferrous metal debris sheared off the surface of the cylindrical non-ferrous pickup bar by the wiper.

12. The device of claim 10, further comprising a release rope, opposing the spring, which when pulled rotates the cylindrical non-ferrous pickup bar against the wiper, thereby shearing ferrous metal objects from the surface of the cylindrical non-ferrous pickup bar.

13. The device of claim 12, further comprising a shock-absorbing device inserted in the release rope, adapted to permit the cylindrical non-ferrous pickup bar to rotate slightly clockwise and counterclockwise, thereby preventing large obstacles from wiping the ferrous metal debris off the cylindrical non-ferrous pickup bar.

14. The device of claim 13, wherein the shock-absorbing device comprises a second spring.

15. The device of claim 10, wherein the wiper is adjustably and removably mounted to the device.

16. A magnetic device for picking up ferrous metal debris, nails, screws, sheet metal fragments, staples, rivets, and other ferrous metal objects from an environmental surface, the ground or a floor by rolling along the surface, the device comprising:

a) a cylindrical non-ferrous pickup bar having a hollow core;

b) a plurality of wheels mounted to the cylindrical non-ferrous pickup bar, the wheels being of larger diameter than the cylindrical non-ferrous pickup bar;

c) a permanent magnet mounted within the hollow core, and adapted to attract ferrous metal debris to the surface of the cylindrical non-ferrous pickup bar;

d) a housing for mounting the wheels;

e) a handle attached to the housing;

f) a wiper attached to the housing and biased against the surface of the cylindrical non-ferrous pickup bar;

g) a spring adapted to bias the magnet next to the environmental surface;

h) a release rope, opposing the spring, which when pulled rotates the cylindrical non-ferrous pickup bar against the wiper, thereby shearing ferrous metal objects from the surface of the cylindrical non-ferrous pickup bar; and i) a shock-absorbing device inserted in the release rope, adapted to permit the cylindrical non-ferrous pickup bar to rotate slightly clockwise and counterclockwise, thereby preventing large obstacles from wiping the ferrous metal debris off the cylindrical non-ferrous pickup bar.

17. The device of claim 16, further comprising an elongate removable hopper attached to the housing and adapted to receive ferrous metal debris sheared off the surface of the cylindrical non-ferrous pickup bar by the wiper.

18. The device of claim 16, wherein the shock absorbing device is a second spring.

* * * * *